US008414842B2

(12) United States Patent
Turc et al.

(10) Patent No.: US 8,414,842 B2
(45) Date of Patent: Apr. 9, 2013

(54) REACTOR AND METHOD FOR TREATING A MATERIAL IN A FLUID REACTION MEDIUM

(75) Inventors: Hubert-Alexandre Turc, Les Angles (FR); Christophe Joussot-Dubien, Rochefort du Gard (FR)

(73) Assignee: Commissariat a l'Energie Atomique (FR)

( * ) Notice: Subject to any disclaimer, the term of this patent is extended or adjusted under 35 U.S.C. 154(b) by 0 days.

(21) Appl. No.: 12/066,515

(22) PCT Filed: Sep. 26, 2006

(86) PCT No.: PCT/EP2006/066762
§ 371 (c)(1),
(2), (4) Date: Mar. 12, 2008

(87) PCT Pub. No.: WO2007/036526
PCT Pub. Date: Apr. 5, 2007

(65) Prior Publication Data
US 2008/0279728 A1 Nov. 13, 2008

(30) Foreign Application Priority Data

Sep. 28, 2005 (FR) ..................................... 05 52924

(51) Int. Cl.
*B01J 3/00* (2006.01)
*F28D 21/00* (2006.01)
(52) U.S. Cl.
USPC ......................................... 422/242; 422/203
(58) Field of Classification Search .................. 422/203, 422/242
See application file for complete search history.

(56) References Cited

U.S. PATENT DOCUMENTS

| 3,056,664 | A | | 10/1962 | Dravnicks et al. | |
|---|---|---|---|---|---|
| 3,066,664 | A | | 10/1962 | Dravnieks et al. | |
| 4,765,809 | A | * | 8/1988 | Reichel et al. | ............. 55/341.11 |
| 5,421,998 | A | | 6/1995 | Li et al. | |
| 5,670,040 | A | * | 9/1997 | Ahluwalia | ................. 210/198.1 |
| 5,997,743 | A | | 12/1999 | Ahn et al. | |
| 6,086,832 | A | * | 7/2000 | Ohta | ............................ 422/211 |
| 6,168,771 | B1 | * | 1/2001 | Saho et al. | ................. 423/245.2 |

(Continued)

FOREIGN PATENT DOCUMENTS

| EP | 0 860 182 | 8/1998 |
|---|---|---|
| EP | 0 860 182 A2 | 8/1998 |

(Continued)

OTHER PUBLICATIONS

Examination report.

(Continued)

*Primary Examiner* — Walter D Griffin
*Assistant Examiner* — Christopher Vandeusen
(74) *Attorney, Agent, or Firm* — Baker & Hostetler LLP

(57) ABSTRACT

A reactor for treating a material in a medium. It includes a body (2) in which is defined a reaction area (10) capable of containing a reaction medium, at least one inlet for introducing the reaction medium into the reaction area, one outlet for discharging effluents out of the reaction area. A protective casing (8) positioned inside the body (2) delimits the reaction area (10). It is spaced apart from the body in order to delimit a confinement area (12) isolating the reaction area of the body. The reaction area and the confinement area are sealably isolated from each other.

7 Claims, 3 Drawing Sheets

U.S. PATENT DOCUMENTS

| | | |
|---|---|---|
| 6,403,729 B1 | 6/2002 | Hergeth et al. |
| 2003/0153216 A1* | 8/2003 | Van-Drentham-Susman . 440/45 |
| 2004/0013588 A1* | 1/2004 | Groos et al. ................. 422/242 |
| 2004/0076561 A1* | 4/2004 | Kajiura et al. ................ 422/187 |

FOREIGN PATENT DOCUMENTS

| | | |
|---|---|---|
| WO | WO 03/064021 | 8/2003 |
| WO | WO 03/064021 A1 | 8/2003 |
| WO | WO 2005/087354 A1 | 9/2005 |
| WO | WO 2006/080959 A1 | 8/2006 |

OTHER PUBLICATIONS

J. Lora, et al., The Effect of Agitation on Reverse Osmosis Desalination, Elsevier Science Pub. B.V., Amsterdam, Desalination 79 (1990) 261-269.

* cited by examiner

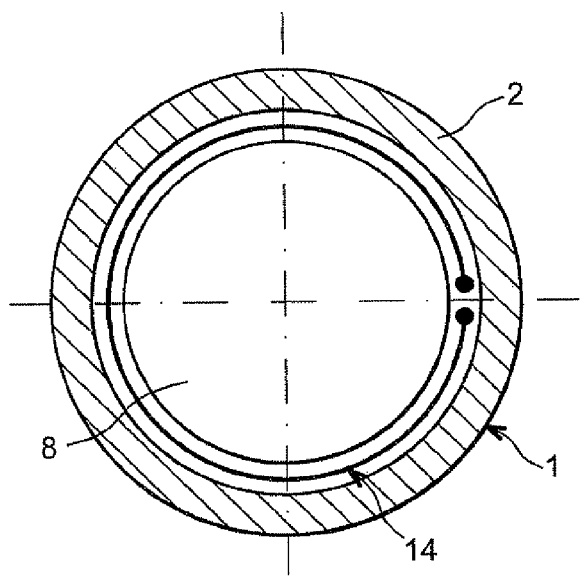
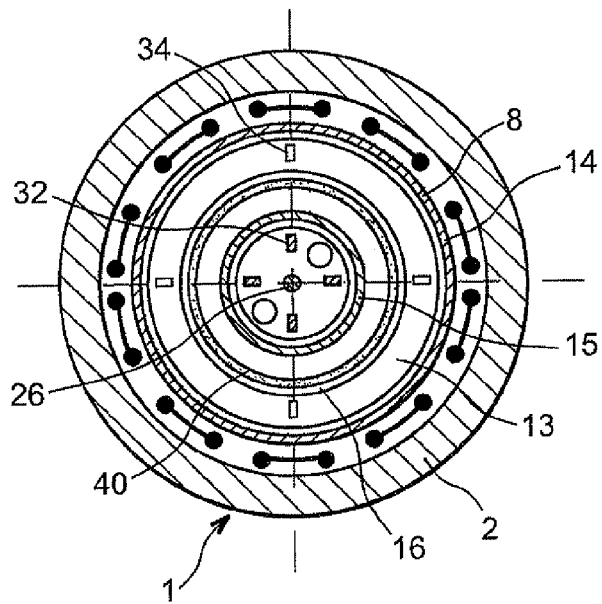
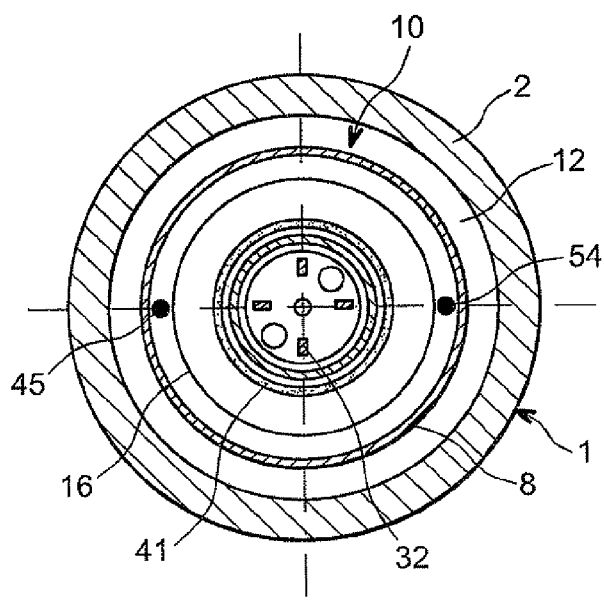

REACTOR AND METHOD FOR TREATING A MATERIAL IN A FLUID REACTION MEDIUM

The invention relates to a reactor for treating a material in a medium, including a sealed body in which is defined a reaction area capable of containing a reaction medium, at least one inlet for introducing the reaction medium into the reaction area, at least one outlet for discharging effluents out of the reaction area.

It also relates to a method for detecting an integrity defect of a protective reactor casing, including a body, the protective casing being housed in the reactor and spaced apart from the body in order to delimit a reaction area capable of containing a reaction medium and a confinement area which sealably isolates the reaction area from the body.

In the field of pressurized methods for treating materials, in particular waste materials, two large families of processes using water as a reaction medium are identified: wet oxidation (WO) methods and hydrothermal oxidation (HO) methods. WO is characterized by temperature and pressure conditions less than the critical conditions of water. Consequently, they operate under biphasic conditions and lead to mineralization kinetics of one or even two orders of magnitude longer than those obtained in HO.

Hydrothermal (HO) oxidation processes in supercritical water use the particular properties of water for pressure and temperature above 221 bars and 374° C. and in particular its low dielectric constant allowing solubilization of hydrophobic compounds, its low density and viscosity allowing mixing in any proportions with gaseous compounds. The obtained reaction medium allows intimate and homogeneous mixing between organic compounds and oxygen having the function of fuel and oxidizer in the mineralization reaction which may then be spontaneously initiated by the temperature of the medium. Gases such as $O_2$, $CO_2$, $N_2$ are totally soluble in water as well as many alkanes. These combustions may then take place without the interphasic transfer limitation generally observed at low temperatures or at low pressures, like in incinerators or wet oxidation processes, and lead to total mineralization of the organic matrix within dwelling times of the order of one minute. HO processes are therefore particularly suitable for treating waste materials requiring total destruction of their organic matrix.

The invention applies both to WO processes and to HO processes which will be called in their global nature, pressurized water processes. However, HO processes are its preferred application. Indeed, the HO high temperature and high pressure operating conditions make its application even more advantageous.

A process and a reactor of this type is already known (FR-2 814 967). The reactor includes a body in which is positioned an internal tube which externally delimits a ring-shaped area with the body and inside, a central area called a lumen. The internal tube includes a first end attached to a first end of the body and a second end which leaves a passage for communication between the ring-shaped area and the central area. According to this method, the constituents of the supercritical medium, i.e. water and an oxidant, are introduced into the vicinity of the first end of the reactor under a pressure above 22.1 MPa. They are heated to a temperature above 374° C. in the ring-shaped area and then introduced into the internal tube at the second end of the reactor at the same time as the material to be treated. A heated mixture of pressurized water/oxidant fluid and of material to be treated is oxidized in a first portion of the internal tube and then cooled in a second portion of this tube.

A reactor of this type however has many drawbacks.

The materials of HO reaction enclosures should withstand corrosion which develops under temperature and pressure. Stainless steels and nickel alloys are materials with which parts under pressure may be made in standard geometries which may simultaneously withstand high temperatures. However, stainless steels are unsuitable in the case of salt, acid or basic waste materials because the passivation layer formed by chromium oxide or hydroxide is not stable. The chloride and phosphate actually appear to be particularly aggressive towards steel during the critical transition encountered in pressurized exchangers of the HO processes.

The passivation layer formed by nickel oxide (NiO) in the case of nickel-based alloys is more stable provided that the pH of the solution is sufficiently neutral. Corrosion rates depend on the nature of the acid forms in the reaction medium and it is observed that these alloys are more sensitive to acids which may more easily cause corrosion products to pass into solution. Nickel-based alloys are insufficient for being suitable for HO treatment of waste materials with a large variability of composition in acids, bases and salts.

On the other hand, the method and the reactor do not provide any filtration for separating the precipitated salts.

On the other hand, a frontal filtration method is known, in which a sintered porous material is crossed by the fluid to be filtered ([1] and U.S. Pat. No. 5,582,191 (Li et al.)). In this method, the build-up of solid materials in front of the filter is only limited by the turbulence resulting from the injection flow rate of the fluid into the reactor. There results a build-up of material on the filter, which leads to reduction in the efficiency of the filtration.

Finally, none of the prior methods provide any efficient recovery and handling of the heat energy released by the HO reaction.

The invention proposes a reactor and a method for treating a material in a fluid reaction medium which remedies these drawbacks.

These goals are achieved by the fact that the reactor includes a protective casing positioned inside the body and delimiting the reaction area, the casing being spaced apart from the body so as to delimit a confinement area isolating the reaction area from the body, the reaction area and the confinement area being sealably isolated from each other.

By this feature, the body of the reactor is isolated from the reaction medium. The confinement area contains a fluid which is neutral towards the material forming the reactor. The latter may therefore be made in a steel having mechanical strength properties exclusively. The reactor is therefore less expensive to make.

The protective casing is subject to little mechanical stresses because it is substantially subject to the same pressure on each of its faces. Therefore it may be made in a material having good corrosion resistance but low mechanical strength, for example titanium. Under oxidizing conditions, the latter forms a titanium oxide passivation layer which is stable in a large pH range. Titanium and its alloys resist to corrosion by HCl over a larger temperature range than stainless steel and nickel alloys and they further have the advantage of not salting out toxic ions $Ni^{2+}$ and $Cr^{6+}$ into the effluent.

In an advantageous embodiment, the reaction area contains a fluid medium under pressure, the confinement area containing a confinement fluid in overpressure relative to the pressure of the fluid of the reaction area, the reactor further including a measuring device for measuring consumption of confinement fluid in the case of a failure of the seal of the protective casing.

Preferably the reactor includes a pressurization capacity containing an amount of confinement fluid, the pressurization capacity being connected to the confinement area through a conduit so as to allow the confinement area to be fed with confinement fluid, a conduit for feeding the reaction area with the reaction fluid medium, a tapping connecting the conduit for feeding the reaction area, to the pressurization capacity so as to set the confinement fluid to the pressure of the reaction fluid medium, a non-return valve with a pressure drop being interposed between the tapping and the reaction area in order to generate a pressure difference between the confinement fluid pressure in the pressurization capacity and the pressure of the reaction fluid medium in the reaction area, a measurement means measuring consumption of the confinement fluid contained in the pressurization capacity.

By these features, it is thereby possible to detect a defect of the integrity of the protective casing by continuously measuring the pressure difference. In the case of piercing of the protective casing, the fluid filling the pressurization capacity will gradually be emptied into the reaction enclosure and is replaced by air under pressure in the pressurization capacity. By detecting or measuring the level in this capacity, failure of the integrity of the protective barrier may be detected and the stopping of the process may be under control. In the case of piercing, the pressure gradient on either side of the protective casing confines the corrosive products in the central area by an incoming leak of pressurization fluid. The body of the reactor is thus never in contact with the products which may alter its integrity.

The invention thus advantageously applies to treatments of organic effluents from the nuclear industry. Indeed, the protective casing of the reaction enclosure provides an additional degree in the safety analysis of the HO method relatively to known installations, notably the method and reactor described in the FR 2 814 967 patent mentioned above. In a reactor of this type, the reactions and the compounds inducing corrosion of the wall of the body of the reactor are confined to a distance from the latter. The reactor of the invention completes this advantage by providing the possibility of a diagnosis of the integrity of this barrier during operation and of dynamic confinement of potentially corrosive elements in the case of piercing of this barrier.

In a preferred embodiment, the reactor includes a heat exchanger positioned in the confinement area and integrated to a primary circuit for circulating a heat transfer fluid in order to achieve heat exchange between the heat transfer fluid flowing in the exchanger and the reaction medium contained in the reaction area.

The use of the protective casing immersed on either side in a pressurized fluid allows the use of stainless steel piping for making the internal heat exchanger because the latter is subject to compression stress and not to tensile stress like the material of the reactor. The walls of the exchanger may therefore be thin, exactly like those of the protective casing. The heat transfer between the reaction medium and the heat transfer fluid is considerably improved as compared with a more conventional configuration where the exchanger is placed on the outer wall of the reactor.

In an advantageous embodiment, the primary circuit for circulating a heat transfer fluid integrates a secondary exchanger and/or an electric resistor servo-controlled by extracting, respectively providing heat power from/to the reaction area and the heat power extracted from the primary circuit is utilized as electrical energy, heating power or pneumatic energy.

Advantageously, the reactor includes an internal tube placed inside the protective casing and sealably attached to the body at a first end or to the protective casing, the interior volume of the sealed tube determining a central area, the tube delimiting a ring-shaped area with the protective casing, a passage for communication between the central area of the tube and the ring-shaped area being provided at a second end of the tube, a stirring turbine including blades stirring up the reaction medium of the central area and blades stirring up the reaction medium of the ring-shaped area.

According to the method for detecting an integrity defect of the protective casing of the reactor:
  the reaction fluid medium is introduced into the reaction area;
  a confinement fluid is introduced into the confinement area from a pressurization capacity;
  the reaction fluid medium of the reaction area and the confinement fluid of the pressurization capacity are pressurized by establishing an overpressure in the confinement area, relative to the reaction area;
  a consumption of confinement fluid is measured in order to detect a possible failure of the protective casing.

According to another feature, the reactor of the invention includes a filter for separating the reaction medium into a permeate with its precipitates having been cleared therefrom and a retentate concentrating the salts and a stirring turbine with which the reaction medium may be stirred up in order to keep it in a turbulent hydraulic flow condition and prevent any build-up of solid retentate in front of the filter.

Advantageously, the turbine is driven magnetically and the filter has the shape of a cylinder positioned coaxially with the internal tube.

In a complementary or alternative way, the effluent passes through a heat exchanger, for example a coil, so as to be in a heat exchange relationship with the material to be treated.

Other features and advantages of the invention will further become apparent upon reading the description which follows of an exemplary embodiment given as an illustration with reference to the appended figures. In these figures:

FIG. 2 is a sectional view along the line II-II of FIG. 1;

FIG. 3 is a sectional view of the reactor of FIG. 1 along the line III-III;

FIG. 4 is a sectional view along the line IV-IV of the reactor illustrated in FIG. 1;

Figure 1:
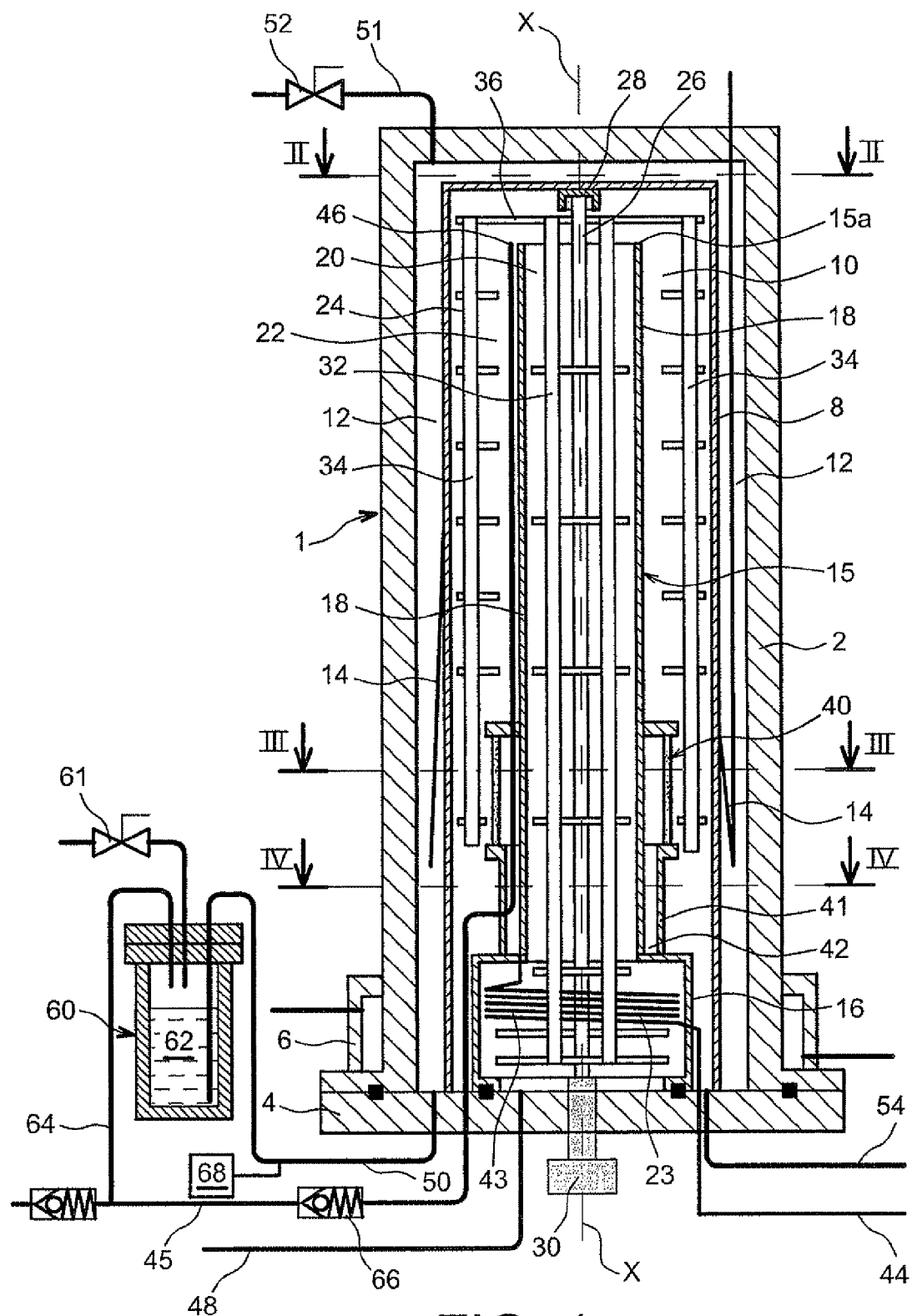
FIG. 1 is a longitudinal sectional view of a reactor according to the present invention.

In the figures, the reactor designated by the general reference 1, consists of a body 2 of a general cylindrical shape with an axis XX closed at its upper end by a bottom and at its lower end by a lid 4.

The lower end of the reactor 1 is kept cold by a double jacket 6 in which flows a coolant fluid, for example water. With this arrangement it is possible to provide a cold high pressure seal between the body 2 and the lid 4 by a gasket in Viton or of the metal type.

A protective casing 8 is positioned inside the body 2 and spaced apart from the latter so as to delimit inside a reaction area 10 and outside a confinement area 12 sealably isolated from each other.

The protective casing 8 has a general cylindrical shape, blind at its upper end. It is mounted coaxially with the body 2 of the reactor and is dimensioned so that the plays on the diameter and the length of the casing may be minimized. It is made in a non-porous material but resistant to corrosion such as titanium.

The attachment of this casing may be made on the lid, as illustrated in FIG. 1, or on the body 2 of the reactor. The cold seal between the casing and body and lid is provided by a Viton gasket, for example.

The reaction area is fed with a reaction fluid medium through a feeding conduit 45. A pressurization capacity 60 contains an amount 62 of confinement fluid. It is connected to the confinement area through a conduit 50 so as to allow it to be fed with confinement fluid. A tapping 64 connects the conduit 45 for feeding the reaction area to the pressurization capacity 60 so as to set the confinement fluid 62 to the pressure of the reaction fluid medium. An anti-return valve 66 with pressure loss is interposed between the tapping 64 and the reaction area in order to generate a pressure difference between the pressure of the confinement fluid 62 in the pressurization capacity 60 and the pressure of the reaction fluid medium in the reaction area. A measuring means 68 measures the consumption of the confinement fluid contained in the pressurization capacity. A valve 61, as shown in FIG. 1, is connected through a conduit to the upper part of the pressurization capacity 60 above the confinement fluid 62.

A primary heat exchanger 14 is provided in the ring-shaped area 12. By having a heat transfer fluid circulate in the primary exchanger 14, it is possible to heat or to extract heat power from the reaction area. It also provides control of the thermal gradients along the reactor. The exchanger 14 belongs to a primary circuit 100 (see FIG. 5) which itself belongs to a system for handling and making use of the heat energy of the reaction area. The structure and the operation of these systems will be explained in more detail subsequently with reference to FIG. 5.

The use of the protective casing 8 immersed on either side in a pressurized fluid allows the use of stainless steel piping for making the internal heat exchanger 14 which is subject to compression stress and not to tensile stress like the material of the reactor. The walls of the exchanger may therefore be thin, exactly like those of the protective casing, and the heat transfer between the reaction medium and the heat transfer fluid is considerably improved as compared with a more conventional configuration where the exchanger is placed on the outer wall of the reactor.

An internal tube designated as a whole by reference 15, is positioned in the reaction area 10 coaxially with the XX axis of the body. It includes a lower portion 16 with a larger diameter and an upper portion 18 with a smaller diameter. The tube 15 includes an open end 15a which provides a passage for communication between the central area 20 and the ring-shaped area 22.

A stirring turbine 24, positioned in the reaction area 10, includes a central shaft 26 of axis XX guided in rotation by a centering device 28 integral with the protective casing 8. The turbine is set into rotation, for example by means of a magnetic drive 30 mounted on the lid 4. It includes blades 32 parallel to the axis 26 positioned in the internal tube 18 and blades 34 also parallel to the axis 26 positioned in the reactive ring-shaped area 22. The blades 32 of the central area 20 and the blades 34 of the ring-shaped area 22 are connected through a coupling 36.

Heat transfers from and to the primary exchanger 14 are improved if the flow of the fluids in the reaction ring-shaped area 22 is turbulent. This point is guaranteed by stirring with the blades 34. Homogeneity in the reaction area is also guaranteed by this device, even in the case when the fluid movements are limited in the direction of flow in order to approach a dwelling time distribution similar to the one existing in piston type flow. The stirring turbine 24 therefore provides decoupling of the heat transfer from the flow of the process fluid.

The totality of the equipment internal to the reaction area operates at quasi equal pressure so that the materials and geometries may be retained without having to take into account requirements of mechanical resistance to pressure. The waste injector tube, the oxidant injector and the outlet exchanger are made in materials resistant to HO corrosion, such as titanium and their thicknesses may be minimized in order to improve heat transfer for which they are the origin.

A cylindrical filtration device 40 is mounted coaxially with the internal injection tube 15 and more specifically, with the portion 18 of smaller diameter of this tube. The filtration device 40 is extended downwards with a ferrule 41 which is also coaxial with the axis XX of the injection tube 15 and which delimits a ring-shaped space 42 with the tube 15.

A tube 43 wound as a coil forming a heat exchanger opens out at one end in the ring-shaped area 42 and at another end 44 outside the reactor 1.

A conduit 45 for feeding an oxidant, for example pressurized air, passes through the lid 4 at the reaction ring-shaped area 22. The conduit 45 extends substantially parallel to the axis XX over the whole length of the internal tube 15 so as to have an end 46 which opens out in the vicinity of the upper end 15a of this tube.

The waste material to be treated penetrates under pressure and at the rated flow through a conduit 48 which passes through the lid 4 in order to open out inside the central reaction area 20. Finally, a conduit 50 allows a pressurized fluid medium, for example water, to be introduced into the confinement area 12. Advantageously, the confinement area is in overpressure with respect to the reaction area, which allows failure of the seal of the protective casing to be detected.

A conduit 51 on which is mounted a fluid purge valve 52 is mounted to the upper portion of the body 2.

Finally, a conduit 54 passes through the lid at the reaction area 52.

The material treatment method takes place in the following way.

The material to be treated penetrates into the central area 20 through the conduit 48 at a rated pressure and flow entirely as a liquid, or as an aqueous suspension containing suspended solid material particles. The material to be treated heats up by flowing against the current of fluid effluent which flows in the exchanger 43 positioned in the portion with a larger diameter 16 of the injection tube 15. The material to be treated then travels through the portion of smaller diameter 18 of the injection tube from its lower end right up to its open end 15a. Given that the end 46 of the tube which allows an oxidant to be injected into the reaction area 10, opens out in the vicinity of the end 15a of the injection tube, the whole central area 20 is in an anoxic condition. It is possible to optimize the location of the oxidant injector 46 and to exploit a portion of the reaction area under supercritical conditions but in anoxia. Depending on the position of the injection of air, the waste material contained in the central injection area may be entirely, partly, or not at all, maintained under anoxic conditions before the oxidizing combustion begins.

The oxidant may be introduced as a gas (air or air enriched in oxygen, ozone, etc.) or as a liquid (liquid oxygen, hydrogen peroxide, etc.).

The material to be treated then travels through the reaction ring-shaped area 22 from top to bottom right up to the microporous filter 40. By means of the stirrer with straight blades 24, it is possible to guarantee turbulence conditions so that filtration is provided under conditions analogous to tangential filtration and not like a filtration of the frontal type by avoiding the formation of cake, i.e. a build-up of solid material in front of the filter. The formation of this cake is standard in frontal filtration. It strongly reduces the filtering capacity of the component. In the turbulent flow conditions which are sought in the reactor of the invention, a tangential flow to the filter is maintained in order to avoid this build-up of material and to thereby guarantee a filtration efficiency as constant as possible over time.

The system for utilizing the combustion energy consists of a primary circuit 100 and a secondary circuit 102. The primary circuit 100 includes the primary exchanger 14, already described earlier, located in the reactor 1. It further includes a secondary exchanger 104 common to the primary circuit and to the secondary circuit. A high temperature circulator 106 causes the heat transfer fluid to permanently circulate in the primary circuit. Optionally, an electrical heater 108 is mounted on the primary circuit. The electrical heater 108 is used in the starting phase of the reactor, before introducing the waste material and producing heat by the HO reaction. It may also be used in an exploitation phase as an alternative to adding a fuel in order to maintain the operating temperature in the reactor.

The primary circuit also includes an expansion capacity 110 with which the heat transfer fluid may be maintained in the primary circuit at the pressure of the reactor.

Figure 5:
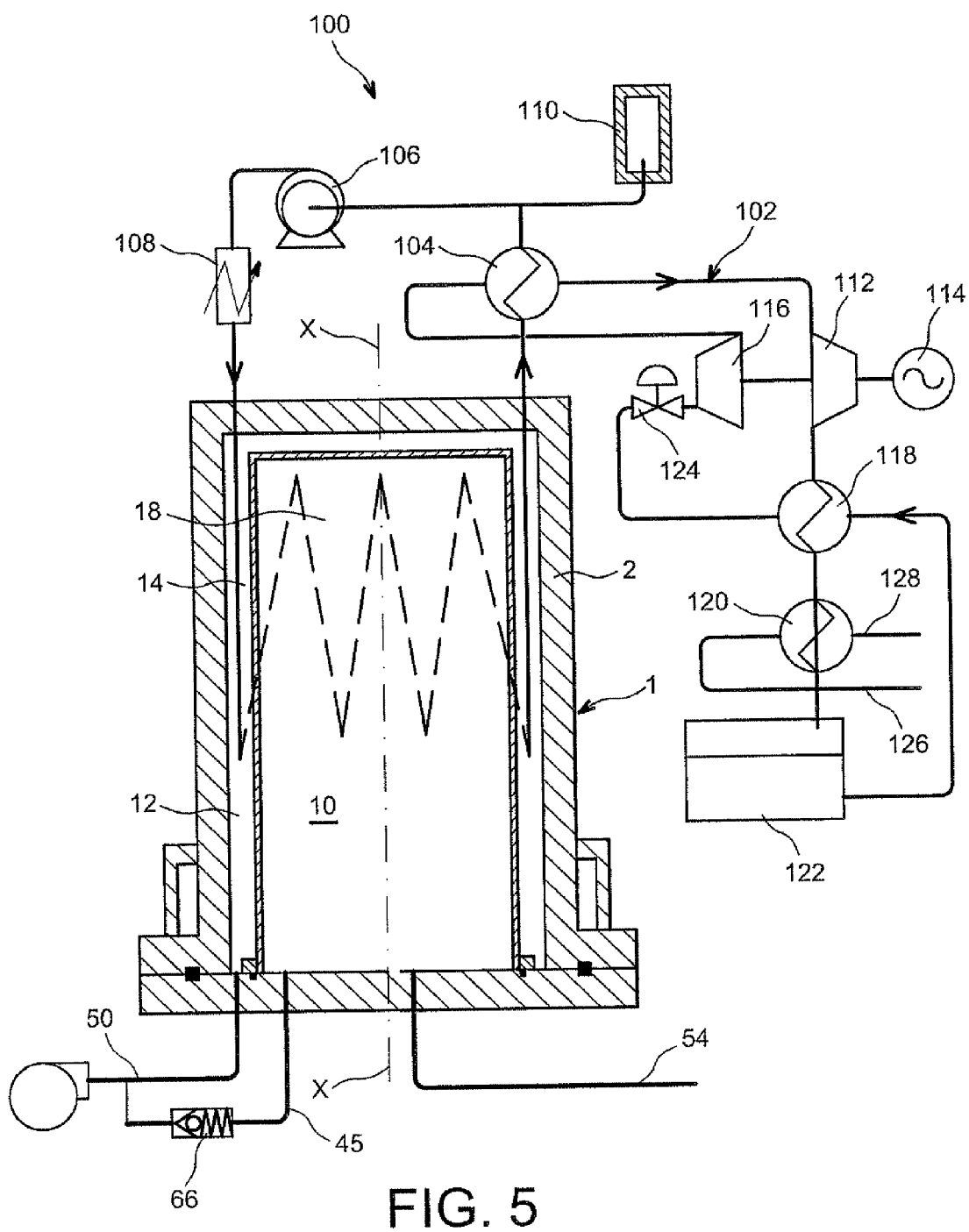
FIG. 5 is a schematic sectional view which illustrates the heat handling configuration of the reaction area.

The secondary circuit includes, in addition to the already mentioned secondary exchanger 104, a turbine 112 which drives an alternator/starter 114 and a compressor 116. Downstream from the turbine 112, a heat recovery exchanger 118 followed by a second heat recovery exchanger 120 are found in the secondary fluid flow direction. A water tank 122 is located after the heat recovery devices 118 and 120. From the water tank, the secondary fluid in the liquid state is heated in the heat recovery device 1128 in which it is vaporized. It is compressed in the compressor 116 after having passed through the stop valve 124. It then flow into the secondary exchanger 104 in which it recovers the heat given off by the primary circuit, and therefore by the HO reaction. The steam raised to a high temperature drives the turbine 112 which allows electricity to be produced by means of the alternator 114. The steam is cooled a first time in the heat recovery device 118, by exchanging heat with water from the tank 122, and a second time in the heat recovery device 120 in which the secondary fluid yields its residual heat not converted into electricity, to a hot water (heating or process) utility network at connection 128 (circulator not shown) with reference 126, as shown in FIG. 5, designating a conduit connection to the utility network.

The secondary circuit therefore utilizes the excess heat power like a co-conversion generator. In other words, it produces electricity and heat with the particularity that the heat power is not provided by a combustion in the gas phase but by the HO reaction. This circuit is based on equipment of the turbogenerator type in a Brayton cycle.

The invention advantageously applies to the treating of organic effluents from the nuclear industry. Indeed, the constraints set by the nuclear safety authorities force miniaturization of the methods for treating fluids loaded with radio-contaminants. HO has proved its applicability to liquid contaminated organic effluents.

In the case of the treatment of highly salt-bearing effluents, the filtration method under supercritical conditions of the invention is advantageously applied to decontaminating aqueous or organic effluents by physical separation, with production of a minority flow concentrating the activity and the mineral elements.

REFERENCE

[1] Goemans M. G. E., Li., Gloyna E. F., Separation of inorganics salts from supercritical water by cross-flow micro filtration, Sep. Sci. Tech. 30(7-9), pp 1491-1509, 1995.

The invention claimed is:

1. A reactor for treating a material in a medium comprising a body (2) in which is defined a reaction area (10) capable of containing a reaction medium, at least one fixed inlet for introducing the reaction medium into the reaction area, at least one fixed outlet separate from the inlet for discharging effluents out of the reaction area, characterized in that the reactor comprises a protective casing (8) positioned inside the body (2) and delimiting the reaction area, the casing being spaced apart from the body so as to delimit a confinement area (12) isolating the reaction area from the body, the reaction area and the confinement area being sealable isolated from each other and in that the reaction area (10) contains a fluid medium under a first pressure, the confinement area (12) containing a confinement fluid under a second pressure higher than the first pressure of the fluid in the reaction area, the reactor further comprising a measuring device (68) for measuring consumption of confinement fluid (62) in the case of failure of the seal of the protective casing, a pressurization capacity (60) containing a fixed amount of confinement fluid (62), with the pressurization capacity being connected to the confinement area of the reactor by a conduit (50) so that the confinement area may be fed with confinement fluid, a feeding conduit (45) for feeding the reaction area with reaction fluid medium, a tapping (64) connected between the pressurization capacity and the feeding conduit for feeding the reaction area from the pressurization capacity (60) so as to set the confinement fluid to the pressure of the reaction fluid medium, and an anti-return valve (66) for interposing a pressure drop between the tapping (64) and the conduit (50) in order to generate a pressure difference between the pressure of the confinement fluid in the pressurization capacity and the pressure of the reaction fluid medium in the reaction area which establishes a difference in pressure between the confinement area and the reaction area and wherein the reactor further comprises a heat exchanger (14) positioned in the confinement area (12) and integrated to a primary circuit (100) for circulating a heat transfer fluid in order to achieve heat exchange between the heat transfer fluid flowing in the exchanger (14) and the reaction medium contained in the reaction area so that heat is extracted out from the reactor with the reactor further comprising an internal tube (15) into which the heat transfer fluid flows with the internal tube (15) placed inside the protective casing (8) and sealably attached to the body (2) at a first end of the tube with the interior volume of the sealed tube determining a central area (20), and with the tube delimiting a ring-shaped area (22) with the protective casing, a passage for communication between the central area of the tube and the ring-shaped area being provided at a second end (15a) of the tube through which the heat transfer fluid exits flowing therefrom in an opposite direction into the ring-shaped area delimited by the protective casing, a stirring turbine (24) including two sets of blades with one set of blades (32) positioned inside the central area for stirring the reaction medium and the second set of blades (34) positioned inside the ring-shaped area.

2. The reactor according to claim 1 wherein the reactor further comprises a secondary exchanger (104) located outside the reactor body (2) and in fluid communication with the heat exchanger (14), with the secondary exchanger servo-controlled providing heat power from/to the reaction area.

3. The reactor according to claim 1 further comprising a secondary circuit which includes a turbine which drives an alternator.

4. The reactor according to claim 1, characterized in that the stirring turbine comprises a shaft rotatably mounted onto the body and/or the protective casing, the shaft bearing internal blades located in the central area of the internal tube and external blades located in the ring-shaped area.

5. The reactor according to claim 1 wherein the heat exchanger comprises a coil.

6. The reactor according to claim 1 characterized in that the reactor comprises a filter (40) for separating the reaction medium into a permeate with its precipitates having been cleared therefrom and a retentate concentrating the salts and wherein the stirring turbine (24) stirs the reaction medium in order to keep it under a turbulent hydraulic flow condition to prevent build-up of solid retentate in front of the filter.

7. The reactor according to claim 6, characterized in that only a single filter is present in the reactor and has the shape of a cylinder positioned coaxially with the internal tube.

\* \* \* \* \*

UNITED STATES PATENT AND TRADEMARK OFFICE
CERTIFICATE OF CORRECTION

PATENT NO. : 8,414,842 B2
APPLICATION NO. : 12/066515
DATED : April 9, 2013
INVENTOR(S) : Hubert-Alexandre Turc et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 470 days.

Signed and Sealed this
Second Day of July, 2013

Teresa Stanek Rea
*Acting Director of the United States Patent and Trademark Office*